(12) United States Patent
Fernandes

(10) Patent No.: US 11,140,628 B2
(45) Date of Patent: Oct. 5, 2021

(54) METHOD FOR CONTROLLING POWER OF A RADIO FREQUENCY SYSTEM

(71) Applicant: Continental Automotive GmbH, Hannover (DE)

(72) Inventor: Brian Sunil Nicholas Fernandes, Singapore (SG)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/638,934

(22) PCT Filed: Sep. 11, 2017

(86) PCT No.: PCT/EP2017/072725
§ 371 (c)(1),
(2) Date: Feb. 13, 2020

(87) PCT Pub. No.: WO2019/048064
PCT Pub. Date: Mar. 14, 2019

(65) Prior Publication Data
US 2020/0367165 A1    Nov. 19, 2020

(51) Int. Cl.
*H04W 52/02* (2009.01)
*H04W 4/80* (2018.01)
*H04W 52/28* (2009.01)

(52) U.S. Cl.
CPC ......... *H04W 52/0229* (2013.01); *H04W 4/80* (2018.02); *H04W 52/287* (2013.01)

(58) Field of Classification Search
CPC . H04W 52/0229; H04W 4/80; H04W 52/287; H04W 52/48; H04W 52/36;
(Continued)

(56) References Cited

U.S. PATENT DOCUMENTS 5,006,812 A * 4/1991 Erickson ............ G01R 31/2822
330/2
5,790,533 A    8/1998 Burke et al.
(Continued)

FOREIGN PATENT DOCUMENTS

| WO | 03034645 A1 | 4/2003 |
|----|-------------|--------|
| WO | 2010027343 A1 | 3/2010 |
| WO | 2015103204 A1 | 7/2015 |

OTHER PUBLICATIONS

International Search Report and Written Opinion for International Application No. PCT/EP2017/072725, dated Jun. 5, 2018, 9 pages.

*Primary Examiner* — Andrew Wendell
(74) *Attorney, Agent, or Firm* — RatnerPrestia

(57) ABSTRACT

A method for saving power of a radio frequency (RF) system is provided herein. The method includes the steps of supplying a RF transmitter of the RF system configured for sending a RF transmission at a first transmission power level and supplying a RF receiver in communication with a controller of the RF system, the RF receiver configured for receiving the RF transmission from the RF transmitter. The controller includes a control algorithm to adjust the transmission power level of the RF transmitter based upon a status of a data frame to be received by the RF receiver. An RF system using the aforesaid method is also provided.

15 Claims, 4 Drawing Sheets

(58) Field of Classification Search
CPC .......... H04W 52/0225; H04W 52/0251; H04B 7/0693; H04M 1/73
See application file for complete search history.

(56) References Cited

U.S. PATENT DOCUMENTS

| | | | |
|---|---|---|---|
| 6,615,052 B1 | 9/2003 | Parmenter | |
| 6,681,101 B1 | 1/2004 | Eidson et al. | |
| 8,514,825 B1 | 8/2013 | Addepalli et al. | |
| 2003/0208715 A1* | 11/2003 | Morgan | H04L 1/0025 714/776 |
| 2006/0083206 A1* | 4/2006 | Min | H04B 17/318 370/338 |
| 2008/0046149 A1 | 2/2008 | Breed | |
| 2008/0161989 A1 | 7/2008 | Breed | |
| 2009/0264091 A1 | 10/2009 | Jensen et al. | |
| 2010/0194195 A1 | 8/2010 | Coumou et al. | |
| 2010/0290407 A1* | 11/2010 | Uemura | H04W 74/0866 370/329 |
| 2014/0250309 A1* | 9/2014 | Dietze | G06F 1/26 713/300 |
| 2015/0036668 A1* | 2/2015 | Kanamarlapudi | H04W 52/146 370/336 |
| 2016/0142880 A1 | 5/2016 | Talluri et al. | |
| 2016/0197510 A1* | 7/2016 | Strommer | H04B 5/0037 320/108 |
| 2017/0085112 A1* | 3/2017 | Leabman | H02J 50/402 |
| 2019/0068253 A1* | 2/2019 | Venkatachalam Jayaraman | H04L 27/2627 |
| 2020/0006988 A1* | 1/2020 | Leabman | A61B 8/56 |

\* cited by examiner

METHOD FOR CONTROLLING POWER OF A RADIO FREQUENCY SYSTEM

CROSS REFERENCE TO RELATED APPLICATIONS

This application is the U.S. National Phase Application of PCT International Application No. PCT/EP2017/072725, filed Sep. 11, 2017, the contents of such application being incorporated by reference herein.

FIELD OF THE INVENTION

This disclosure relates to communication systems suitable for wireless or radio communications, in particular radio frequency (RF) systems capable of exchanging signals with other devices. Specifically, this disclosure relates to a method for controlling power of a radio frequency system, for power saving purposes, for use in a vehicular environment.

BACKGROUND OF THE INVENTION

Communication networks are increasingly complex, to meet the demands of different applications or environment, depending on mode of usage. An example is the demand to implement communication networks for vehicular environment. Vehicular network architecture is required for internal applications within a vehicle, such as relaying notifications between different modules of the vehicle, but yet at the same time, shall also be capable of supporting external applications, for eg. use of mobile devices for vehicle access authentication. Other factors to consider when designing network architecture for vehicular environment may also include thermal management and potential loss of network signals due to path loss.

An example of how network architecture implemented in a vehicular environment to improve power efficiency is as disclosed in U.S. Pat. No. 8,514,825 B1, incorporated herein by reference, relating to a system and method for power control of a vehicle access network (VAN), using a distributed power vector approach. U.S. Pat. No. 8,514,825 B1 teaches using a stored value of Signal to Interference-plus-Noise Ratio (SINR). The steps includes the requirement of calculating an updated SINR for the power control algorithm for benchmarking against a stored SINR value. However, the method as disclosed in U.S. Pat. No. 8,514,825 B1 requires very specific calculation of SINR for benchmarking purposes.

In contrast with the reality of a vehicular environment, occurrence of path loss of radio frequency systems within a passenger compartment can be very dynamic. Path loss of radio frequency signals may be due to obstacles such as child seats, materials used for child seats and even number of passengers seated within the passenger compartment. It is therefore desirable to implement a method of controlling radio frequency transmissions of a radio frequency system within a vehicular environment, that saves power, yet at the same time, is capable of supplying a wide margin of transmission power, such that power can be increased, decreased or maintained, to adapt to the different given scenarios or environment of the passenger compartment, to ensure that ample power is supplied at all times while having power saving function, to prolong vehicle battery life.

SUMMARY OF THE INVENTION

An aspect of the invention is a method for controlling power of a radio frequency system with power saving function to prolong battery life. Yet at the same time, a further aspect provides a wide range of power, to ensure that sufficient power is being supplied for radio frequency transmission despite different scenarios or environment surrounding the radio frequency system.

In a first aspect, a method for saving power of a radio frequency (RF) system is provided. The steps comprises of supplying a RF transmitter of the RF system configured for sending a RF transmission at a first transmission power level and supplying a RF receiver in communication with a controller of the RF system, the RF receiver configured for receiving the RF transmission from the RF transmitter. The controller further comprises a control algorithm to adjust the transmission power level of the RF transmitter based upon a status of a data frame to be received by the RF receiver. Advantageously, the control algorithm adjusts the transmission power level of the RF transmitter by increasing, decreasing, maintaining or resetting the power level to a default setting based upon whether the data frame is received. This allows the controller to dynamically adjust the transmission power level based on a condition of a passenger compartment, which may be causing a transmission path loss, thus achieving the objectives of power saving and providing a wide range of power to ensure that sufficient power is being supplied for RF transmission, to support applications of the vehicular environment. Advantageously, the RF transmission is provided at an optimized power level at any given time.

Preferably, the method may further comprise supplying an interim transponder for initiating a request for the RF transmitter to send the RF transmission. The interim transponder may be capable of receiving and transmitting other types of wireless radio signals or radio frequency protocols, to support other desirable applications. Examples of suitable signals or protocol may include low frequency (LF), Bluetooth Low Energy (BLE), Bluetooth or ultra wide band (UWB).

The control algorithm may increase the transmission power level of the RF transmitter to a second transmission power level in the event the data frame is not received by the RF receiver. Advantageously, the control algorithm makes an assumption that the RF transmitter has insufficient transmission power to send the RF transmission when no data frame is received by the RF receiver and increases the transmission power level accordingly, to ensure sufficient power is being supplied.

The control algorithm may maintain the transmission power level of the RF transmitter in the event that the data frame is received by the RF receiver. Under the circumstances where data frame is received by the RF receiver, the control algorithm assumes there is sufficient transmission power, and maintains the transmission power level accordingly.

The control algorithm may reset the transmission power level of the RF transmitter to a default setting after a period of time. An advantage of resetting the transmission power level to a default setting after a period of time enables power efficiency management, especially when the scenario or environment changes to one where there is lower transmission path loss, thus achieving power saving function and prolong vehicle battery life.

Preferably, in the event that the data frame is not received by the RF receiver at default setting, the steps of increasing, maintaining and/or resetting the transmission power level of the RF transmitter may be repeated. In this way, the controller adjusts the transmission power level according to a condition of the vehicular environment which may be causing the path loss.

Preferably, where the RF system comprises a plurality of RF transmitters, one or more adjustments for transmission power level may be repeated with each of the RF transmitters of the RF system, for adjusting the overall transmission power level of an entire RF system. Advantageously, the overall transmission power level of the entire RF system is optimized, thereby enabling power saving function throughout the RF system and providing a wide range of power to ensure that sufficient power is being supplied for RF transmission.

Advantageously, with the wide range of power levels that can be provided by the system, each unique situation or scenario surrounding the system may be addressed optimally and the net power utilization of the RF system can be kept to the minimum required. In the event of an urgent need for RF transmission or for clearer RF transmission, the controller may be programmed to increase the RF transmission power level to meet the transmission needs. Otherwise, the RF transmitter may be programmed to transmit at lower or lowest power levels, thereby enabling the power saving function of the system. As opposed to prior art methods where high power is used at all times, customization of power levels is provided by the present method.

In a second aspect, a method of saving power of a radio frequency system within a motor vehicle according to the aforesaid steps may be provided.

In a third aspect, a vehicular system having a radio frequency system with power saving functions according to the aforesaid steps is provided. The radio frequency (RF) system may be embedded within a motor vehicle. The RF system comprises of a plurality of radio frequency transmitters for sending a RF transmission to a radio frequency receiver, a radio frequency receiver in communication with a controller, the radio frequency receiver configured to receive the RF transmission from the plurality of radio frequency transmitters, and the controller comprising a control algorithm configured to adjust an overall transmission power level of the radio frequency transmitters based upon a status of a data frame to be received by the radio frequency receiver. Preferably, the control algorithm adjusts the transmission power level of the RF transmitter by increasing, decreasing, maintaining or resetting the power level to a default setting based upon the status of data frame to be received, thus allowing the controller to dynamically adjust the transmission power level based on a condition of a passenger compartment causing a path loss.

More preferably, the RF system may further comprise an interim transponder to initiate one or more requests for the RF transmitter to send a RF transmission. The interim transponder may be operable to receive and transmit a wireless signal or a radio frequency protocol. More preferably, the wireless signal or radio frequency protocol is selected from the group consisting of low frequency (LF), Bluetooth Low Energy (BLE), Bluetooth and ultra wide band (UWB).

BRIEF DESCRIPTION OF THE DRAWINGS

Other aspects will become apparent from the following description of embodiments with reference to the accompany drawings in which.

DETAILED DESCRIPTION OF THE PREFERRED EMBODIMENTS

Hereinafter, exemplary embodiments of the present invention will be described in detail with reference to the accompanying drawings.

Figure 1:
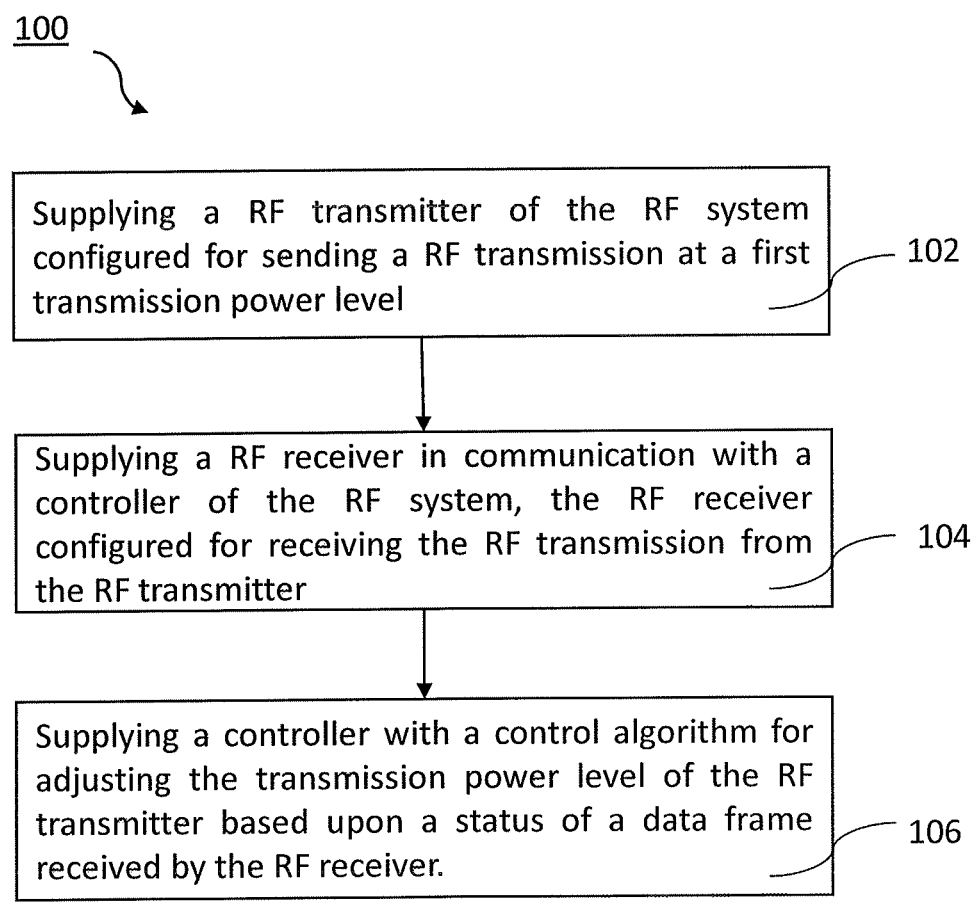
FIG. 1 shows a flowchart for a method for controlling power of a radio frequency system according to a preferred embodiment.

FIG. 1 shows a flowchart illustrating a method 100 for controlling power of a radio frequency system according to a preferred embodiment. At step 102, a radio frequency (RF) transmitter of the RF system is supplied, for sending a RF transmission at a first transmission power level. In a next step 104, a RF receiver in communication with a controller of the RF system is supplied. The RF receiver is configured for receiving the RF transmission from the RF transmitter. At step 106, a controller with a control algorithm for adjusting the transmission power level of the RF transmitter is supplied. The control algorithm adjusts the transmission power level of the RF transmitter based upon a status of a data frame to be received by the RF receiver.

In an alternative embodiment, the method may include an additional step of supplying an interim transponder configured for initiating a request for the RF transmitter to send the RF transmission. Ideally, the interim transponder transmits and receives short-range, wireless frequency signals or radio frequency signals or protocols. It shall be understood the interim transponder may be a transceiver or a combination of transmitter and receiver for transmitting and receiving short-range, wireless frequency signals or other radio frequency protocols suitable for implementing multiple applications within a vehicular environment. Common characteristics of short range wireless signals include signals covering a physical range between a few centimetres to several meters. This provision of an interim transponder allows flexible design configuration based on desired range of frequency signals and desired applications. This interim transponder may be capable of receiving and transmitting short range signals, for example a low frequency (LF) signal, a Bluetooth Low Energy (BLE) signal, a Bluetooth signal or other forms of radio frequency protocol, such as ultra wide band (UWB). It shall be understood by a practitioner skilled in the art that other forms of radio frequency or wireless signals supporting bidirectional radio communication systems, full duplex or half duplex communication systems shall be applicable.

Figure 2A:
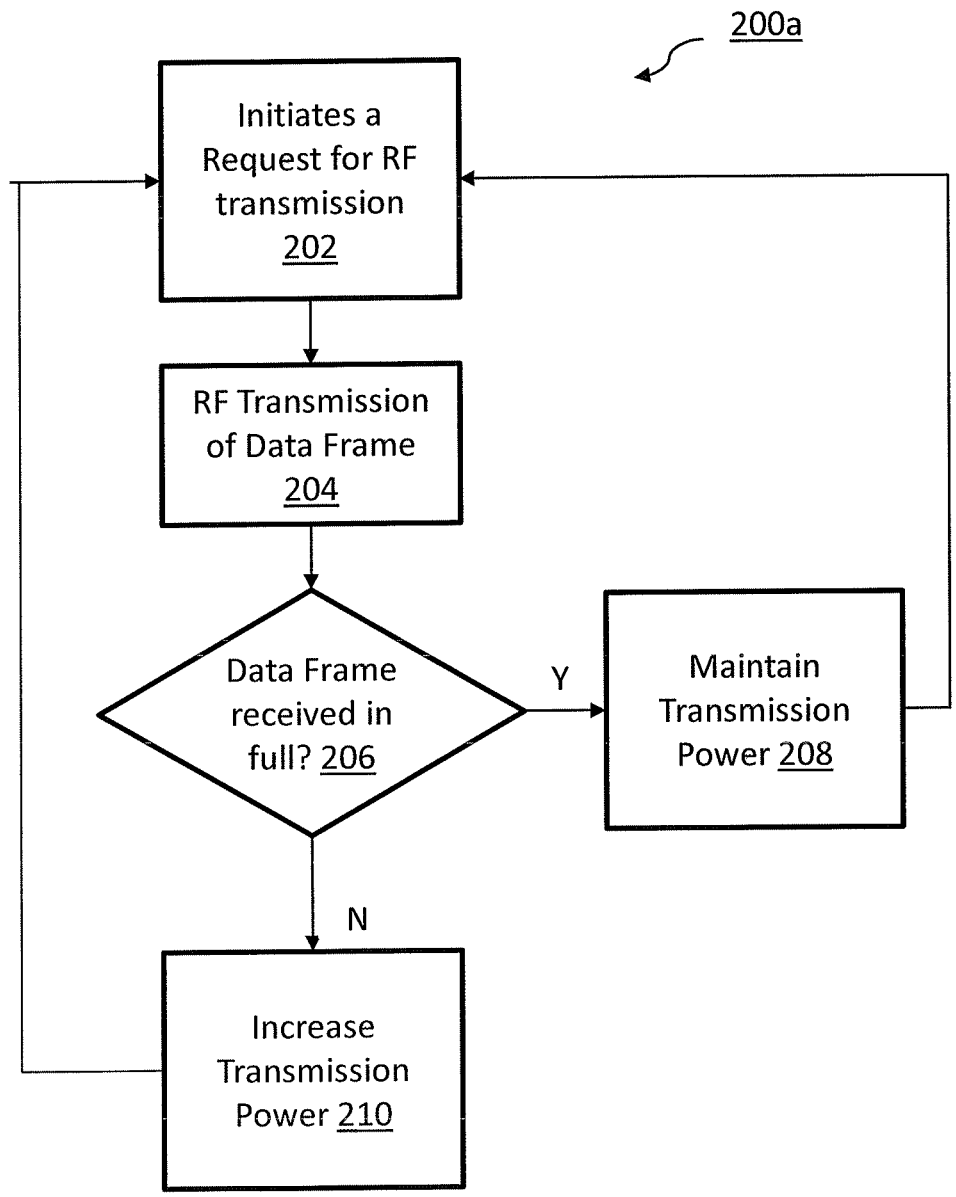
FIG. 2A shows a flowchart of a control algorithm in accordance to a preferred embodiment.

With reference to FIG. 2A which shows a flowchart for the control algorithm 200a of a preferred embodiment, in step 202, a request to the RF transmitter for a RF transmission is initiated. The RF transmitter sends a RF transmission in response, in the form of data frame to the controller, at step 204. The control algorithm at step 206, makes a decision to either maintain or increase the transmission power level. The decision is based on whether the data frame or RF message is received by the RF receiver. In the event that the data frame is not received by the RF receiver, the control algorithm assumes that there is insufficient transmission power level, thus increases power to the RF transmitter to a second transmission power level at step 210. A repeat request for RF transmission is then initiated, i.e. step 202 repeated, at the second transmission power level. On the other hand, in the event that the data frame is received by the RF receiver, the control algorithm assumes there is sufficient power, thus maintains the transmission power level of the RF transmitter at step 208. This achieves the objective of ensuring sufficient power is supplied efficiently at all times to support the RF communication applications.

To enable power saving function, the control algorithm may reset the transmission power of the RF transmitter to a default setting after a period of time. The default setting may be for instance, a default minimum power required to support RF communication. The steps of 202, 204 and 206 are repeated and the request for RF transmission is executed at default settings. In the event that the data frame is not received by the controller, the controller assumes there is insufficient power to complete the transmission of data frame, and the control algorithm adjusts the RF power setting to a value higher than the default setting. The control algorithm may optionally overwrite the default setting with this higher value so that a new default setting is set. This may be useful in applications where many iterations of the algorithm are undesired, such as when immediate RF transmissions are required. Similarly, in the event that the data frame is received, the controller assumes there is sufficient power and thus the control algorithm maintains the power level of the RF transmitter.

In another embodiment, the control algorithm resets the transmission power level of the RF transmitter to the default setting in the event that the RF system has been idle for a period of time. The objective of controlling power of the RF system power saving function to prolong battery life is therefore achieved.

Figure 2B:
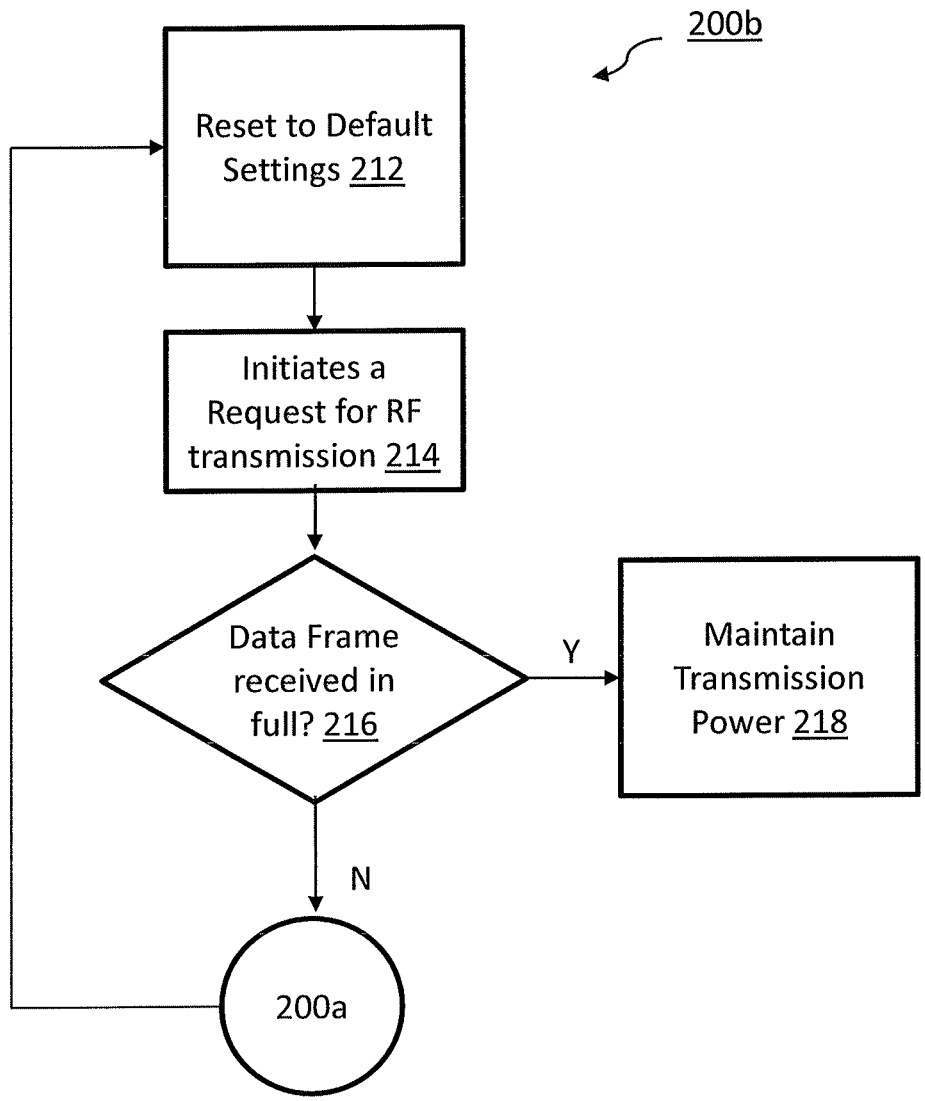
FIG. 2B shows a flowchart of a control algorithm in accordance to a second preferred embodiment.

Turning now to FIG. 2B, flowchart illustrates how the method 200b for controlling power level of the RF system works, in accordance with an alternative embodiment, assuming now, the RF system is operating at default settings, at step 212. At step 214, a request for RF transmission is initiated. At step 216, the control algorithm makes a decision on whether the data frame is received in full. If the control algorithm determines that the data frame is received in full, the control algorithm executes a next step 218, to maintain power transmission. In the event that the data frame is not received by the RF receiver when the RF transmitter is operating at default setting, the method repeats the steps as provided in flowchart 200a, where the control algorithm makes a decision in accordance to the status of data frame to be received at step 206, to either execute step 208 to maintain transmission power level, or in the alternative, execute step 210 to increase the transmission power level, in response to the request initiated by the controller, for a request for RF transmission signal at step 202. This dynamically adjusts power of each of the RF transmitters of the RF system, according to different condition or situations of the environment, mitigating the problem of transmission path loss.

Where the RF system comprises a plurality of RF transmitters, one or more adjustments for transmission power level may be repeated with each of the RF transmitters of the RF system, for adjusting the overall transmission power level of an entire RF system.

In an alternative embodiment, the method for saving power of a radio frequency system may be applied to a motor vehicle environment. Within a vehicular environment, in particular the passenger compartment, occurrence of path loss of radio frequency systems can be very dynamic. Typically, path loss of radio frequency signals within a passenger compartment can be due to refraction, diffraction, reflection or absorption of signals influenced by environment. In a typical vehicular environment, path loss can be due to obstacles within the passenger compartment, for example vehicle seats, child seats, materials used for manufacturing of seats, number of passengers seated within the passenger compartment, size of passenger and even the material of clothes passengers are wearing.

By way of examples, a larger sized passenger will have higher absorption, and the radio frequency signals transmitted by the RF transmitter will have a greater path loss. Thus, RF transmission in such example will be required at a higher power level in order for the RF receiver to receive the transmission. In contrast to a child with smaller absorption area, RF transmission at that same power level may be higher than required, resulting in power wastage. In certain scenarios, the child may be seated on a child seat and depending on the structural design of the child seat, as well as materials used for constructing the child seat, radio frequency signals may be reflected. Under such circumstances, it may then be necessary to increase the RF transmission power of the RF transmitter embedded near to the child seat.

Applying the method of controlling power of a radio frequency system to a vehicular environment assist to saves power of the RF system within a motor vehicle. By adapting to the different condition or scenarios of the environment of the passenger compartment, transmission power level of each individual RF transmitter is dynamically adjusted to ensure sufficient power is supplied at all times while enabling power saving function and prolonging vehicle battery life.

Figure 3:
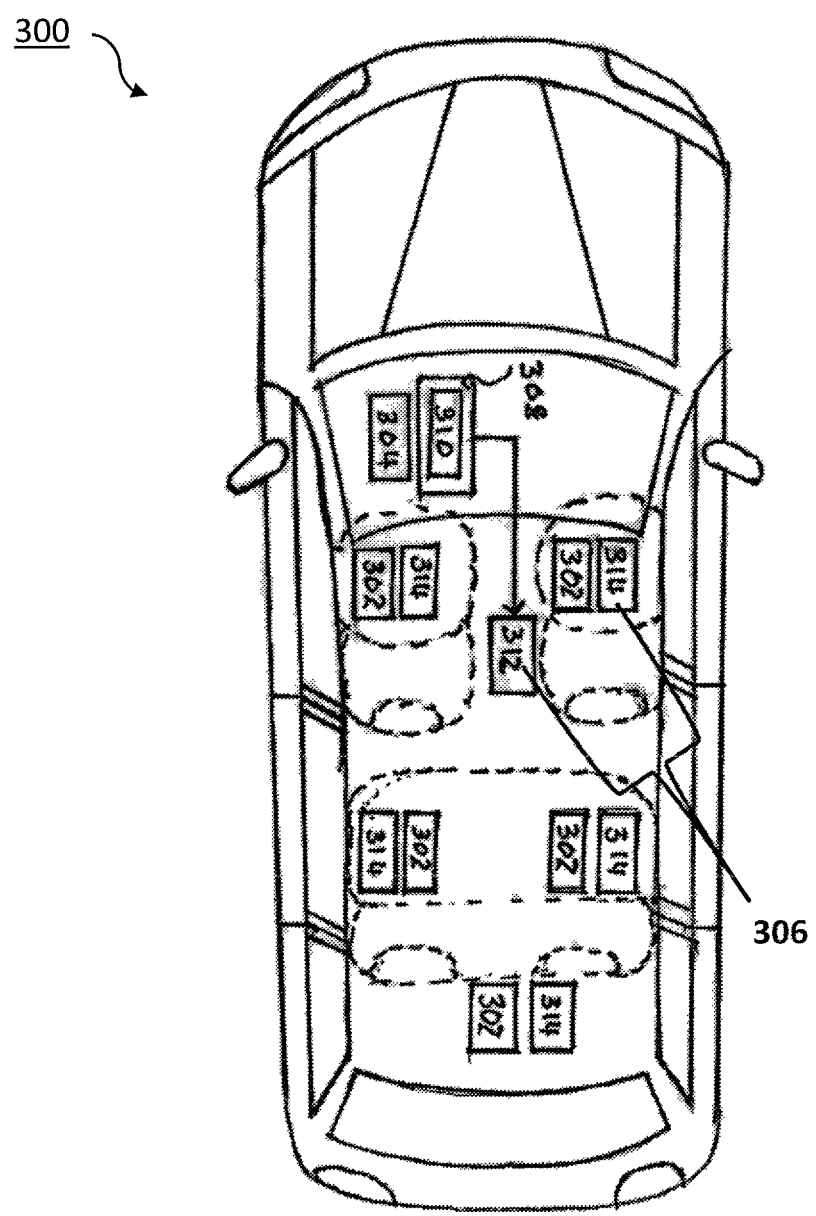
FIG. 3 shows a radio frequency system within a vehicle in accordance to a preferred embodiment.

FIG. 3 shows a vehicular system 300 having a radio frequency system with power saving functions according to a preferred embodiment. The radio frequency (RF) system 300 may be embedded within a motor vehicle. The RF system 300 comprises of a plurality of radio frequency transmitters, collectively referred to as 302, each radio frequency transmitter 302 operable to send a RF transmission to a radio frequency receiver 304. A controller 308 for initiating adjustments of a transmission power level for at least one of the RF transmitters 302 is provided. A radio frequency receiver 304 is in communication with the controller 308. The radio frequency receiver 304 is configured to provide a status of whether a data frame is received from the plurality of radio frequency transmitters 302. The controller 308 further comprises a control algorithm 310 configured to adjust an overall transmission power level of the radio frequency transmitters 302 based upon a status of data frame to be received by the radio frequency receiver 304.

The RF system may further comprises an interim transponder 306 to initiate one or more requests for the RF transmitter 302 to send a RF transmission. The interim transponder 306 may be a transceiver or a combination of transmitter 312 and receiver 314, operable for transmitting and receiving short-range, wireless frequency signals covering a physical range between a few centimetres to several meters, suitable for RF communication networks. This interim transponder 306 may be capable of receiving short range, wireless signals or radio frequency protocol. Examples of suitable technologies include low frequency (LF), a Bluetooth Low Energy (BLE) or a Bluetooth or ultra wide band.

While the preferred embodiment and alternative embodiments of the invention have been disclosed and described in detail herein, it may be apparent to practitioners skilled in the art that various changes in form and detail may be made therein without departing from the spirit and scope thereof.

The invention claimed is:

1. A method for saving power of a radio frequency system including an RF transmitter, an RF receiver and a controller, the method comprising the steps of:
   transmitting, by the RF transmitter, a data frame at a first transmission power level;
   receiving, by the RF receiver, the data frame from the RF transmitter;
   determining, by the controller, whether the data frame is received in full by the RF receiver;
   increasing, by the controller, the transmission power level of the RF transmitter to a second transmission power level for a subsequent transmission of a subsequent data frame in the event the data frame is not received in full by the RF receiver;
   maintaining, by the controller, the first transmission power level in the event the data frame is received in full by the RF receiver;
   resetting, by the controller, the second transmission power level to a default setting when the RF transmitter is determined to be idle for a period of time; and
   repeating, by the controller, the preceding steps for subsequent data frames.

2. The method according to claim 1, further comprising supplying an interim transponder configured for initiating a request for the RF transmitter to send the RF transmission.

3. The method according to claim 2, wherein the interim transponder is capable of receiving and transmitting wireless radio signal or radio frequency protocol.

4. The method according to claim 3, wherein the wireless radio signal or radio frequency protocol is selected from the group consisting of low frequency, Bluetooth Low Energy, Bluetooth and ultra wide band.

5. The method according to claim 1, wherein the first transmission power level is the default setting.

6. The method according to claim 1, wherein the RF system comprises a plurality of RF transmitters, the method further comprising the steps of:
   increasing, by the controller, the transmission power level of one or more of the plurality of RF transmitters to the second transmission power level for the subsequent transmission of the subsequent data frame in the event the data frame is not received in full by the RF receiver; and
   resetting, by the controller, the second transmission power level to a default setting when the one or more of the plurality of RF transmitters is determined to be idle for a period of time.

7. A method of saving power of a radio frequency system within a motor vehicle according to claim 1.

8. The method according to claim 5, further comprising overwriting, by the controller, the default setting with the second transmission power level.

9. A vehicular system having a radio frequency (RF) system embedded within a motor vehicle, the RF system comprising:
   an RF transmitter for transmitting a data frame at a first transmission power level;
   an RF receiver configured to receive the data frame transmitted from the RF transmitter; and
   a controller configured to:
      a) determine whether the data frame is received in full by the RF receiver,
      b) increase the transmission power level of the RF transmitter to a second transmission power level for a subsequent transmission of a subsequent data frame in the event the data frame is not received in full by the RF receiver,
      c) maintain the first transmission power level in the event the data frame is received in full by the RF receiver,
      d) reset the second transmission power level to a default setting when the RF transmitter is determined to be idle for a period of time, and
      e) repeat steps (a) to (d) for subsequent data frames.

10. The vehicular system according to claim 9, wherein the RF system further comprises an interim transponder to initiate one or more requests for the RF transmitter to send a RF transmission.

11. The vehicular system according to claim 10, wherein the interim transponder is operable to receive and transmit a wireless radio signal or a radio frequency protocol.

12. The vehicular system according to claim 11, wherein the wireless radio signal or radio frequency protocol is selected from the group consisting of low frequency, Bluetooth Low Energy, Bluetooth and ultra wide band.

13. The system according to claim 9, further comprising a plurality of RF transmitters, and
   wherein the controller is configured to:
      increase the transmission power level of one or more of the plurality of RF transmitters to the second transmission power level for the subsequent transmission of the subsequent data frame in the event the data frame is not received in full by the RF receiver, and
      reset the second transmission power level to a default setting when the one or more of the plurality of RF transmitters is determined to be idle for a period of time.

14. The system according to claim 9, wherein the first transmission power level is the default setting.

15. The system according to claim 14, wherein the controller is further configured to:
   overwrite the default setting with the second transmission power level.

* * * * *